United States Patent
Salhi et al.

(10) Patent No.: US 12,313,433 B2
(45) Date of Patent: May 27, 2025

(54) SYSTEM FOR MEASURING A PLURALITY OF PHYSICAL PARAMETERS AT A MEASUREMENT POINT WITH A MULTIMODE OPTICAL FIBER

(71) Applicant: SAFRAN, Paris (FR)

(72) Inventors: Nassim Salhi, Moissy-Cramayel (FR); Minh Chau Phan Huy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 190 days.

(21) Appl. No.: 17/759,482

(22) PCT Filed: Jan. 22, 2021

(86) PCT No.: PCT/FR2021/050118
§ 371 (c)(1),
(2) Date: Jul. 26, 2022

(87) PCT Pub. No.: WO2021/152244
PCT Pub. Date: Aug. 5, 2021

(65) Prior Publication Data
US 2023/0050697 A1    Feb. 16, 2023

(30) Foreign Application Priority Data

Jan. 30, 2020   (FR) ..................... 2000934

(51) Int. Cl.
*G01D 5/353*   (2006.01)
*G01K 11/3206*   (2021.01)
*G01L 1/24*   (2006.01)

(52) U.S. Cl.
CPC ..... *G01D 5/35316* (2013.01); *G01D 5/35383* (2013.01); *G01K 11/3206* (2013.01);
(Continued)

(58) Field of Classification Search
CPC ........... G01D 5/35316; G01D 5/35354; G01D 5/35383; G01D 5/35358; G01K 11/3206; G01L 1/246
See application file for complete search history.

(56) References Cited

U.S. PATENT DOCUMENTS

| | | | |
|---|---|---|---|
| 2015/0285683 A1* | 10/2015 | Ouellette | G01D 5/35383 356/451 |
| 2017/0010463 A1 | 1/2017 | Morizur et al. | |
| 2020/0025593 A1* | 1/2020 | Froggatt | G01B 11/18 |

FOREIGN PATENT DOCUMENTS

EP   2975366 A1 *  1/2016  ......... G01D 5/35316

OTHER PUBLICATIONS

International Search Report for issued in Application No. PCT/FR2021/050118 dated May 11, 2021.
(Continued)

*Primary Examiner* — Michelle R Connelly
*Assistant Examiner* — Kirsten D. Endresen
(74) *Attorney, Agent, or Firm* — McDonald Hopkins LLC

(57) ABSTRACT

In the field of measuring physical parameters with a multimode optical fiber, a system for measuring P physical parameters at one or more measurement points has one or more multimode optical fibers. The system includes: a light source generating a source optical signal, a multimode measurement optical fiber transporting optical signals in at least M distinct second predetermined propagation modes, M being an integer greater than or equal to P, the measurement optical fiber including a measurement section reflecting the optical signals with a wavelength variable according to physical parameters to be measured, a detection device measuring wavelengths of the optical signals reflected by the measurement section, and an optical module generating M signals from the source optical signal, the M signals each being injected into the measurement optical fiber to propa-
(Continued)

gate in one of the modes, the optical module also transferring the optical signals reflected toward the detection device.

10 Claims, 2 Drawing Sheets

(52) U.S. Cl.
CPC .......... *G01L 1/246* (2013.01); *G01D 5/35312* (2013.01); *G01D 5/35358* (2013.01)

(56) References Cited

OTHER PUBLICATIONS

Written Opinion for PCT/FR2021/050118 dated May 11, 2021.
Search Report issued in French Patent Application No. 2000934 dated January 13, 2021.

Jirapong, Lim et al. "Strain and Temperature Sensors Using Multimode Optical Fiber Bragg Gratings and Correlation Signal Processing", IEEE Transactions on Instrumentation and Measurement, IEEE Service Center, Aug. 4, 2002, vol. 51, No. 4, Piscataway, NJ, US, XP011073956.

Eftimov, T. A. et al. "Sensing with a LP01-LP02 intermodal interferometer" Journal of Lightwave Technology, IEEE, Dec. 12, 1993, pp. 2150-2156, vol. 11, No. 12, USA, XP000422678.

Chao, Li et al. "Simultaneous measurement of refractive index, strain, and temperature based on a four-core fiber combined with a fiber Bragg grating", Optics & Laser Technology, 2017, 179-184, vol. 90.

Shuo, Fang et al. "A smart graded-index multimode fiber based sensor unit for multiparameter sensing applications", Optics and Photonics Journal, 2013, 265-267.

Oliveira, Ricardo et al. "Multiparameter POF sensing based on multimode interference and fiber bragg grating", Journal of Lightwave Technology, Jan. 1, 2017, vol. 35, No. 1.

* cited by examiner

SYSTEM FOR MEASURING A PLURALITY OF PHYSICAL PARAMETERS AT A MEASUREMENT POINT WITH A MULTIMODE OPTICAL FIBER

This is the National Stage of PCT international application PCT/FR2021/050118, filed on Jan. 22, 2021 entitled "SYSTEM FOR MEASURING A PLURALITY OF PHYSICAL PARAMETERS AT A MEASUREMENT POINT WITH A MULTIMODE OPTICAL FIBER", which claims the priority of French Patent Application No. 2000934 filed Jan. 30, 2020, both of which are incorporated herein by reference in their entireties.

TECHNICAL FIELD

The invention concerns the field of measuring physical parameters with an optical fiber. It relates to a system for measuring a plurality of physical parameters at one or more measurement points with one or more multimode optical fibers.

The invention applies in particular to the measurement of the temperature and the deformation at a point of a structure with an optical fiber having a Bragg grating, but applies more generally to the measurement of any physical parameter capable of being quantified by a sensitive element of an optical fiber such as a Bragg grating or a Fabry-Perot cavity. The measurement of the physical parameter can also be based on Rayleigh scattering, the Raman effect or Brillouin scattering.

PRIOR ART

Bragg grating fiber-optic sensors constitute a suitable solution for measuring the temperature and deformation at one or more points of a structure, in particular when the space available for integration of sensors is limited or these sensors are subjected to significant thermal and/or mechanical stresses. A Bragg grating fiber-optic sensor comprises an optical fiber including at least one Bragg grating inscribed on a section of the optical fiber, referred to as the measurement section. Depending on the thermomechanical stresses applied to this section, the patterns of the Bragg grating are more or less spaced apart from one another. The Bragg wavelength, for which a light beam is reflected, therefore differs according to these stresses. The determination of the offset of the Bragg wavelength with respect to a reference wavelength thus makes it possible to measure a physical parameter at the measurement section. To measure both the temperature and the deformation, two optical fibers are generally used. A first optical fiber comprising a first Bragg grating is freely mounted in a capillary so as to be subjected only to thermal stresses, and a second optical fiber comprising a second Bragg grating is adhered to the structure so as to be subjected to deformations resulting from both thermal stresses and mechanical stresses. The solution of a system of two equations with two unknowns makes it possible to determine each of the unknowns, namely the temperature and the deformation. The fiber optic sensor may optionally measure a larger number of physical parameters. Nevertheless, it must comprise as many optical fibers as physical parameters to be measured. This results in a relatively complicated integration and mounting of the sensor.

Another solution for measuring two physical parameters at a point by means of a Bragg grating fiber optic sensor consists in discriminating the polarizations of the electric field of the signal passing through the optical fiber. The Bragg grating has, in the transverse electric (TE or S) polarization, a sensitivity $K_{S,\varepsilon}$ to deformation and a sensitivity $K_{S,\theta}$ to temperature. It has, in the transverse magnetic polarization (TM or P), a sensitivity $K_{P,\varepsilon}$ to deformation and a sensitivity $K_{S,\theta}$ to temperature. Thus, for a single Bragg grating, it is possible to determine the deformation and the temperature at this Bragg grating. This solution is, however, limited to the determination of two physical parameters. It is also complicated to implement due to the need to maintain the polarization of the signal in the optical fiber.

It has also been proposed to use a multicore optical fiber, the cores of which have different sensitivities to the different physical parameters to be measured. This solution is described in the article of Chao Li et al, "Simultaneous measurement of refractive index, strain, and temperature based on a four-core fiber combined with a fiber Bragg grating", Optics & Laser Technology, Vol. 90, 2017, 179-184. It is relatively complex to implement insofar as it requires the identification of a multicore fiber having different sensitivities for different physical parameters to be measured. In addition, the connections are not standardized for this type of optical fiber, making the interfacing thereof particularly complicated.

The above-mentioned solutions for measuring a plurality of physical parameters at a measurement point therefore are not entirely satisfactory. An objective of the invention is to propose a technique for measuring a plurality of physical parameters by means of a compact sensor having a relatively simple structure, allowing for the design, manufacture and use thereof in any type of industry.

DISCLOSURE OF THE INVENTION

To this end, the invention is based on a differentiated exploitation of the different signal propagation modes in a multimode optical fiber. The multimode optical fiber has a sensitive element at a measurement section arranged to reflect optical signals in different propagation modes with a wavelength, or a wavelength offset, variable according to the physical parameters to be measured. As the wavelength offset is also variable according to the propagation mode, the solution of a system of equations makes it possible to determine each physical parameter by means of a single optical fiber and at a single measurement section of this fiber.

More specifically, the invention relates first to a system for measuring P physical parameters with a multimode optical fiber, P being an integer greater than or equal to two, including:
  a light source, arranged to generate a source optical signal,
  a multimode measurement optical fiber arranged to transport optical signals in at least M second predetermined propagation modes that are distinct from one another, M being an integer greater than or equal to P, the measurement optical fiber including a measurement section arranged to reflect the optical signals with a wavelength that is variable according to the physical parameters to be measured,
  a detection device arranged to measure wavelengths of the optical signals reflected by the measurement section, and
  an optical module arranged to generate M optical signals from the source optical signal, the optical signals being injected into the measurement optical fiber in order to propagate each in one of the second propagation modes, the optical module also being arranged to transfer the optical signals reflected toward the detection device.

The light source can be a broadband light source or a tunable light source. It preferably has a bandwidth sufficient for measuring a multitude of wavelengths. The bandwidth is, for example, greater than or equal to 3 nm.

The measurement optical fiber is necessarily a multimode optical fiber. It may be slightly multimodal, i.e. have physical properties so that the number of propagating modes varies from several units to several dozen modes, or strongly multimodal, i.e. have physical properties so that the number of propagating modes varies from several dozen to several hundred modes.

The measurement section of the measurement optical fiber acts as a sensitive element. It is arranged to reflect the optical signals with a wavelength that is variable according to the physical parameters to be measured. In other words, it is arranged to reflect each incident optical signal as a reflected optical signal having a wavelength depending upon the different physical parameters to be measured. The parameters of sensitivity of the measurement section to the different physical parameters differ according to the signal propagation modes. Thus, for a given variation of a physical parameter, the wavelength variations of the reflected signal with respect to the incident signal are different from one another according to the propagation mode. The knowledge of the wavelengths of the different reflected optical signals thus makes it possible, by solving a system of equations, to determine the different physical parameters.

According to a first particular embodiment, the optical module includes:

M transmission optical fibers, each transmission optical fiber being arranged to transport an optical signal in a first predetermined propagation mode, and a mode multiplexer connected, on the one hand, to the M transmission optical fibers and, on the other hand, to the measurement optical fiber, the mode multiplexer being arranged to transfer the optical signals received from the transmission optical fibers to the measurement optical fiber by converting each first propagation mode into one of the second propagation modes, and arranged to transfer each reflected optical signal received from the measurement optical fiber to one of the transmission optical fibers by converting each second propagation mode into the first propagation mode associated with the transmission optical fiber.

According to the invention, a mode multiplexer performs both a multiplexing and a demultiplexing function. It can therefore be called a "mode multiplexer/demultiplexer". Nevertheless, to be concise, it is simply referred to as a "mode multiplexer" in the present document. The mode multiplexer makes it possible, on the one hand, to generate optical signals having different propagation modes for the measurement optical fiber and, on the other hand, to recover the wavelength information associated with each propagation mode on distinct receiving channels, in this case the M transmission optical fibers, thereby facilitating the determination of these wavelengths. The mode multiplexer establishes a one-to-one relationship between the first propagation mode of each transmission optical fiber and one of the second propagation modes of the measurement optical fiber.

An example of a mode multiplexer according to the invention is described in the patent application US 2017/010463 A1.

Advantageously, the transmission optical fibers are single-mode optical fibers. Each first propagation mode is thus the fundamental mode. The transmission optical fibers may also be multimode optical fibers. Nevertheless, a single mode is used in each transmission optical fiber.

According to a first alternative of the first particular embodiment, the measurement system additionally includes an optical splitter arranged to receive the source optical signal, to split this source optical signal into M optical signals and to deliver, to each transmission optical fiber, an optical signal in the first propagation mode associated with said transmission optical fiber.

The optical splitter distributes the power of the source optical signal over all of the transmission optical fibers. The distribution may or may not be equal.

The optical splitter may also be arranged to receive the reflected optical signals received from the transmission optical fibers, to add these reflected optical signals in order to obtain a reconstituted optical signal and to deliver said reconstituted optical signal to the detection device. The measurement system may also include an optical circulator arranged to transfer the source optical signal from the light source to the optical splitter and to transfer the reconstituted optical signal to the detection device.

According to a second alternative of the first embodiment, the measurement system also includes an optical switch arranged to receive the source optical signal, to temporally divide this source optical signal into M optical signals and to deliver, to each transmission optical fiber, an optical signal in the first propagation mode associated with the transmission optical fiber.

The optical switch may also be arranged to receive the reflected optical signals received from the transmission optical fibers, to temporally join these reflected optical signals in order to obtain a reconstituted optical signal and to deliver said reconstituted optical signal to the detection device. The measurement system may also include an optical circulator arranged to transfer the source optical signal from the light source to the optical switch and to transfer the reconstituted optical signal to the detection device.

In an alternative embodiment of the invention, the detection device includes K detectors, K being an integer greater than or equal to two and less than or equal to M, each detector being arranged to measure a wavelength of one or more reflected optical signals received from one or more transmission optical fibers. Each detector is, for example, connected to a transmission optical fiber by means of an optical circulator, the optical circulator being arranged to transfer each optical signal coming from the optical splitter or the optical switch to the mode multiplexer and to transfer each reflected optical signal coming from the mode multiplexer to the detector.

When the spectral range of operation of the mode multiplexer is too limited for the number of physical parameters to be measured, and therefore for the number of second propagation modes to be generated, a plurality of mode multiplexers may be used. A mode multiplexer is defined for a certain spectral width, typically 10 to 30 nm. However, the spectral width of the source optical signal may exceed this value and reach 50 to 100 nm. In this case, the mode multiplexer is not sized to cover the entire working range of the light source. The use of a plurality of mode multiplexers thus makes it possible to cover the entire spectral range of the light source. As an example, for a light source emitting between 1520 and 1580 nm, that is, a spectral width of 60 nm, three mode multiplexers may be used, the first operating between 1520 and 1540 nm, the second between 1540 and 1560 nm and the third between 1560 and 1580 nm.

Thus, according to a second particular embodiment, the optical module includes:

- X first transmission optical fibers, X being an integer greater than or equal to two, each first transmission optical fiber being arranged to transport an optical signal in a first predetermined propagation mode,
- a second multimode transmission optical fiber arranged to transport optical signals in at least X second predetermined propagation modes that are distinct from one another,
- Y third transmission optical fibers, Y being an integer greater than or equal to two, each third transmission optical fiber being arranged to transport an optical signal in a third predetermined propagation mode, the sum of X and Y being equal to M,
- a fourth multimode transmission optical fiber arranged to transport optical signals in at least Y second predetermined propagation modes that are distinct from one another and X second propagation modes,
- a first mode multiplexer connected, on the one hand, to the X first transmission optical fibers and, on the other hand, to the second transmission optical fiber, the first mode multiplexer being arranged to transfer the optical signals received from the first transmission optical fibers to the second transmission optical fiber by converting each first propagation mode into one of the X second propagation modes, and arranged to transfer each reflected optical signal received from the second transmission optical fiber to one of the first transmission optical fibers by converting each second propagation mode into the first propagation mode associated with said first transmission optical fiber,
- a second mode multiplexer connected, on the one hand, to the Y third transmission optical fibers and, on the other hand, to the fourth transmission optical fiber, the second mode multiplexer being arranged to transfer the optical signals received from the third transmission optical fibers to the fourth transmission optical fiber by converting each third propagation mode into one of the Y second propagation modes, and arranged to transfer each reflected optical signal received from the fourth transmission optical fiber to one of the third transmission optical fibers by converting each second propagation mode into the third propagation mode associated with said third transmission optical fiber,
- a source-side optical splitter or a source-side optical switch, the source-side optical splitter being arranged to receive the source optical signal, to split this source optical signal into X+Y optical signals, to deliver, to each first transmission optical fiber, an optical signal in the first propagation mode associated with said first transmission optical fiber and to deliver, to each third transmission optical fiber, an optical signal in the third propagation mode associated with said third transmission optical fiber, the source-side optical switch being arranged to receive the source optical signal, to temporally divide this source optical signal into X+Y optical signals, to deliver, to each first transmission optical fiber, an optical signal in the first propagation mode associated with said first transmission optical fiber, and to deliver, to each third transmission optical fiber, an optical signal in the third propagation mode associated with said third transmission optical fiber, and
- a measurement-side optical splitter or a measurement-side optical switch, the measurement-side optical splitter being arranged, on the one hand, to receive the optical signals from the first mode multiplexer and the second mode multiplexer, to add these optical signals in order to obtain a common optical signal, and to deliver this common optical signal to the measurement optical fiber and, on the other hand, to receive a reflected common optical signal, to split this reflected common optical signal into two optical signals and to deliver each of these optical signals to one of the first and second mode multiplexers, the measurement-side optical switch being arranged, on the one hand, to receive the optical signals from the first mode multiplexer and the second mode multiplexer, to temporally join these optical signals in order to obtain a common optical signal and to deliver this common optical signal to the measurement optical fiber, and, on the other hand, to receive a reflected common optical signal, to temporally divide this reflected common optical signal into two optical signals and to deliver each of these optical signals to one of the first and second mode multiplexers.

The first transmission optical fibers and/or the third transmission optical fibers may be single-mode fibers, each of the first propagation modes and/or each of the third propagation modes being the fundamental mode.

The source-side optical splitter may include:
- a first-order optical splitter arranged to receive the source optical signal and to split this source optical signal into a first intermediate optical signal and a second intermediate optical signal,
- a first second-order optical splitter arranged to receive the first intermediate optical signal, to split this intermediate optical signal into X optical signals and to deliver, to each first transmission optical fiber, an optical signal in the first propagation mode associated with said first transmission optical fiber, and
- a second second-order optical splitter arranged to receive the second intermediate optical signal, to split this intermediate optical signal into Y optical signals and to deliver, to each third transmission optical fiber, an optical signal in the third propagation mode associated with said third transmission optical fiber.

The source-side optical switch may include:
- a first-order optical switch arranged to receive the source optical signal and to temporally divide this source optical signal into a first intermediate optical signal and a second intermediate optical signal,
- a first second-order optical switch arranged to receive the first intermediate optical signal, to temporally divide this intermediate optical signal into X optical signals and to deliver, to each first transmission optical fiber, an optical signal in the first propagation mode associated with said first transmission optical fiber, and
- a second second-order optical switch arranged to receive the second intermediate optical switch, to temporally divide this intermediate optical signal into Y optical signals and to deliver, to each third transmission optical fiber, an optical signal in the third propagation mode associated with said third transmission optical fiber.

In a particular embodiment, the measurement system also includes a processing unit arranged to determine each of the P physical parameters according to wavelengths of the optical signals reflected by the measurement section and P×M predetermined sensitivity parameters $K_{PP}(j,i)$, each sensitivity parameter $K_{PP}(j,i)$ representing a sensitivity to a physical parameter $PP_j$ of the measurement section for the second propagation mode i, with i being an integer between 1 and M and j being an integer between 1 and P.

Each optical splitter may be arranged to receive reflected optical signals, to add these optical signals and to deliver them to another component. In particular, the source-side optical splitter may be arranged to receive the X+Y reflected optical signals, to add these optical signals in order to obtain a reconstituted optical signal and to deliver this reconstituted optical signal to the detection device.

Similarly, each optical switch may be arranged to receive reflected optical signals, to temporally join these optical signals and to deliver them to another component. In particular, the source-side optical switch may be arranged to receive the X+Y reflected optical signals, to temporally join these optical signals in order to obtain a reconstituted optical signal and to deliver this reconstituted optical signal to the detection device.

Preferably, the ranges of operation of the first mode multiplexer and the second mode multiplexer do not overlap and are included in the spectral range of the light source.

The measurement system according to the first and second particular embodiments makes it possible to measure a plurality of physical parameters at the measurement section of a single multimode optical fiber. The invention is nevertheless applicable to the measurement of a plurality of physical parameters at measurement sections of a plurality of multimode optical fibers.

Thus, the invention also relates to a system for measuring P+Q physical parameters with multimode optical fibers, P and Q being two integers greater than or equal to two, including:
  a light source, arranged to generate a source optical signal,
  a first multimode measurement optical fiber arranged to transport optical signals in at least M second predetermined propagation modes that are distinct from one another, M being an integer greater than or equal to P, the first measurement optical fiber including a first measurement section arranged to reflect the optical signals with a wavelength that is variable according to the physical parameters to be measured,
  a second multimode measurement optical fiber arranged to transport optical signals in at least N predetermined fourth propagation modes that are distinct from one another, N being an integer greater than or equal to Q, the second measurement optical fiber including a second measurement section arranged to reflect the optical signals with a wavelength that is variable according to the physical parameters to be measured,
  a detection device arranged to measure wavelengths of the optical signals reflected by each of the measurement optical fibers, and
  an optical module arranged to generate, from the source optical signal, M+N optical signals, M optical signals being injected into the first measurement optical fiber so as each to propagate in one of the second propagation modes and N optical signals being injected into the second measurement optical fiber so as each to propagate in one of the fourth propagation modes, the optical module also being arranged to transfer the reflected optical signals to the detection device.

According to a particular embodiment, the optical module includes:
  M first transmission optical fibers, M being an integer greater than or equal to P, each first transmission optical fiber being arranged to transport an optical signal in a first predetermined propagation mode,
  a first mode multiplexer connected, on the one hand, to the M first optical fibers and, on the other hand, to the first measurement optical fiber, the first mode multiplexer being arranged to transfer the optical signals received from the first transmission optical fibers to the first measurement optical fiber by converting each propagation mode into one of the second propagation modes, and arranged to transfer each reflected optical signal received from the first measurement optical fiber to one of the first transmission optical fibers by converting each second propagation mode into the first propagation mode associated with said first transmission optical fiber,
  N second transmission optical fibers, N being an integer greater than or equal to Q, each second transmission optical fiber being arranged to transport an optical signal in a third predetermined propagation mode,
  a second mode multiplexer connected, on the one hand, to the N second transmission optical fibers and, on the other hand, to the second measurement optical fiber, the second mode multiplexer being arranged to transfer the optical signals received from the second transmission optical fibers to the second measurement optical fiber by converting each third propagation mode into one of the fourth propagation modes, and arranged to transfer each reflected optical signal received from the second measurement optical fiber to one of the second transmission optical fibers by converting each fourth propagation mode into the third propagation mode associated with said second transmission optical fiber, and
  an optical splitter or an optical switch, the optical splitter being arranged to receive the source optical signal, to split this source optical signal into M+N optical signals, to deliver, to each first transmission optical fiber, an optical signal in the first propagation mode associated with said first transmission optical fiber and to deliver, to each second transmission optical fiber, an optical signal in the third propagation mode associated with said second transmission optical fiber, the optical switch being arranged to receive the source optical signal, to temporally divide this source optical signal into M+N optical signals, to deliver, to each first transmission optical fiber, an optical signal in the first propagation mode associated with said first transmission optical fiber, and to deliver, to each second transmission optical fiber, an optical signal in the third propagation mode associated with said second transmission optical fiber.

The first transmission optical fibers and/or the second transmission optical fibers may be single-mode optical fibers, each of the first propagation modes and/or each of the third propagation modes being the fundamental mode.

The optical splitter may include:
  a first-order optical splitter arranged to receive the source optical signal and to split this source optical signal into a first intermediate optical signal and a second intermediate optical signal,
  a second-order first optical splitter arranged to receive the first intermediate optical signal, to split this intermediate optical signal into M optical signals and to deliver, to each first transmission optical fiber, an optical signal in the first propagation mode associated with said first transmission optical fiber, and
  a second second-order optical splitter arranged to receive the second intermediate optical signal, to split this intermediate optical signal into N optical signals and to deliver, to each second transmission optical fiber, an optical signal in the third propagation mode associated with said second transmission optical fiber.

The optical switch may include:
a first-order optical switch arranged to receive the source optical signal and to temporally divide this source optical signal into a first intermediate optical signal and a second intermediate optical signal,
a first second-order optical switch arranged to receive the first intermediate optical signal, to temporally divide this intermediate optical signal into M optical signals and to deliver, to each first transmission optical fiber, an optical signal in the first propagation mode associated with said first transmission optical fiber, and
a second second-order optical switch arranged to receive the second intermediate optical signal, to temporally divide this intermediate optical signal into N optical signals and to deliver, to each second transmission optical fiber, an optical signal in the third propagation mode associated with said second transmission optical fiber.

The measurement system may additionally include a processing unit arranged to determine each of the P+Q physical parameters according to the wavelengths of the optical signals reflected by the measurement optical fibers, P×M predetermined sensitivity parameters $K_{PP}(j,i)$ and Q×N predetermined sensitivity parameters $K_{PP}(l,k)$, each sensitivity parameter $K_{PP}(j,i)$ representing a sensitivity to a physical parameter $PP_j$ of the first measurement section for the second propagation mode i, with i being an integer between 1 and M and j being an integer between 1 and P, each sensitivity parameter $K_{PP}(l,k)$ representing a sensitivity to a physical parameter $PP_l$ of the second measurement section for the fourth propagation mode k, with k being an integer between 1 and N and l being an integer between 1 and Q.

The various optional features and advantages associated with the system for measuring P physical parameters with a multimode optical fiber described above are applicable to the system for measuring P+Q physical parameters with multimode optical fibers.

In each of the measurement systems according to the invention, each measurement section includes, for example, a Bragg grating or a Fabry-Perot cavity.

BRIEF DESCRIPTION OF THE DRAWINGS

Other features, details and advantages of the invention will become clear on reading the description that follows, provided solely as an example and with reference to the appended drawings, wherein.

DETAILED DESCRIPTION

Figure 1:
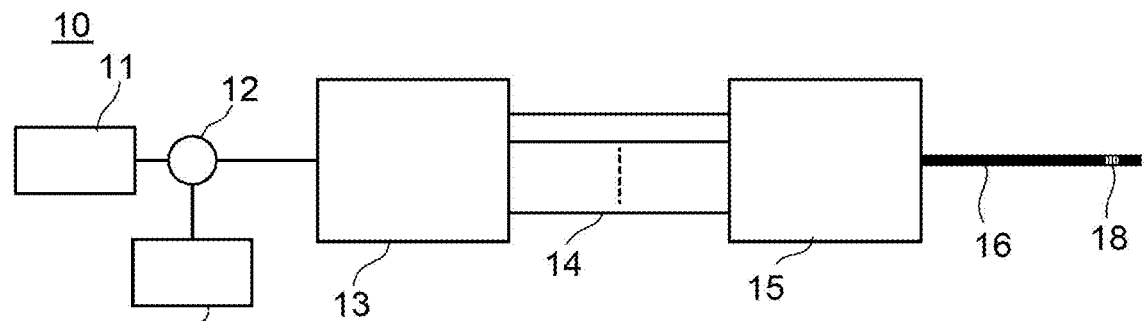
FIG. 1 shows a first example of a system for measuring P physical parameters with a multimode optical fiber according to the invention.

FIG. 1 shows a first example of a system for measuring physical parameters with a multimode optical fiber according to the invention. The measurement system 10 makes it possible to measure P physical parameters, P being an integer greater than or equal to two. It includes a light source 11, an optical circulator 12, an optical switch 13, M single-mode optical fibers 14, a mode multiplexer/demultiplexer 15, hereinafter referred to more simply as "mode multiplexer 15", a multimode optical fiber 16 and a detection device 17. The number M is an integer greater than or equal to P. In the example of FIG. 1, the optical fibers 14 make it possible to transport optical signals in the fundamental mode. The measurement system according to the invention makes it possible, however, to use multimode optical fibers. The signal is thus transported in each optical fiber according to a single propagation mode, referred to as the "first propagation mode". The first propagation mode may differ according to the optical fibers. The multimode optical fiber 16 is arranged to transport optical signals in at least M second predetermined propagation modes that are distinct from one another. It includes a Bragg grating 18 on a section, referred to as the "measurement section". The light source 11 may be a broadband source or a tunable source. A broadband source has, for example, a bandwidth greater than or equal to 3 nm. The optical circulator 12 receives, on a first input/output, a source optical signal coming from the light source 11 and transfers this source optical signal to a second input/output, intended for the optical switch 13. The optical switch 13 is arranged to receive the source optical signal, to temporally divide this signal into M identical optical signals and to deliver, to each optical fiber 14, one of these optical signals in the fundamental mode. Instead of the optical switch 13, an optical splitter may be used. The optical splitter splits the power of the source optical signal in order to generate M identical optical signals. The mode multiplexer 15 is connected to the optical fibers 14 and to the multimode optical fiber 16. It is arranged to transfer the optical signals received from the optical fibers 14 to the multimode optical fiber 16 by converting each first propagation mode into one of the M second propagation modes. It is also arranged to transfer each reflected optical signal received from the multimode optical fiber 16 to one of the optical fibers 14 by converting each second propagation mode into the fundamental mode. Each reflected optical signal is directed by the mode multiplexer 15 to the optical fiber 14 from which it comes, so as to establish a one-to-one relationship between each optical fiber 14 and a second propagation mode of the multimode optical fiber. The detection device 17 is arranged to measure the wavelengths of the reflected optical signals transported by the optical fibers 14.

The measurement system 10 may also include a processing unit, not shown, arranged to determine each of the P physical parameters according to the wavelengths of the reflected optical signals determined by the detection device 17 and P×M predetermined sensitivity parameters $K_{PP}(j,i)$. Each sensitivity parameter $K_{PP}(j,i)$ represents a sensitivity to a physical parameter $PP_j$ of the Bragg grating 18 for the second propagation mode i, with i being an integer between 1 and M and j being an integer between 1 and P.

The physical parameters are determined by the solution of a system of M equations with P unknowns, each equation for mode i being written:

$$\Delta\lambda_i = \sum_{j=1}^{P} K_{PP}(j, i) \times PP_j$$

where $\Delta\lambda_i$ represents a variation in the wavelength of an optical signal associated with mode i with respect to a reference wavelength.

When the number of parameters to be measured is less than the number of modes (P<M), the system of equations is overdetermined. At least some physical parameters can then be determined multiple times and therefore determined more precisely.

Figure 2:
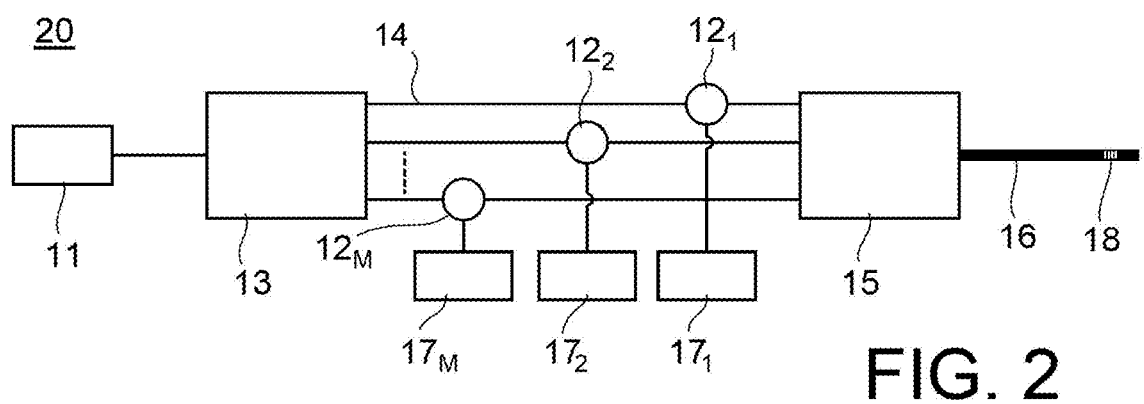
FIG. 2 shows a second example of a system for measuring P physical parameters with a multimode optical fiber according to the invention, the measurement system including a plurality of detectors.

FIG. 2 shows a second example of a system for measuring P physical parameters with a multimode optical fiber according to the invention. The measurement system 20 according to this embodiment essentially differs from the measurement system 10 described in reference to FIG. 1 in that the detection device 17 is formed by M independent detectors $17_1$, $17_2$, ... $17_M$. The measurement system 20 includes M optical circulators $12_1$, $12_2$, ..., $12_M$. Each optical circulator $12_i$ is connected to two sections of one of the optical fibers 14 and to a detector $17_i$, so that each optical signal coming from the optical switch 13 is transferred to the mode multiplexer modal 15 and each reflected optical signal coming from the mode multiplexer 15 is transferred to the associated detector $17_i$. The processing unit may similarly recover the wavelengths of the different reflected optical signals in order to determine the P physical parameters at the Bragg grating 18.

Figure 3:
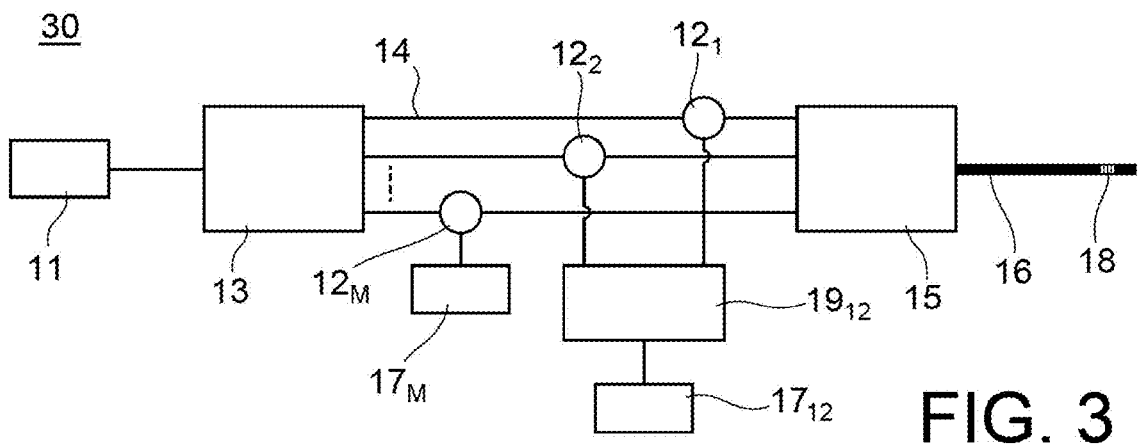
FIG. 3 shows a third example of a system for measuring P physical parameters with a multimode optical fiber according to the invention, the measurement system including a common detector with two propagation modes.

FIG. 3 shows a third example of a system for measuring P physical parameters with a multimode optical fiber according to the invention. The measurement system 30 according to this embodiment essentially differs from the measurement system 20 described in reference to FIG. 2 in that the detection device 17 is formed by a number of detectors strictly lower than M. The measurement system 30 still includes M optical circulators $12_i$; It also includes one or more signal combiners. In this case, it includes a signal combiner $19_{12}$ connected to the optical circulators $12_1$ and $12_2$ in order to receive the reflected optical signals transported by two optical fibers 14, and arranged to temporally add or join these signals and transfer them to the detector $17_{12}$. The other detectors $17_i$ receive a single reflected optical signal.

Figure 4:
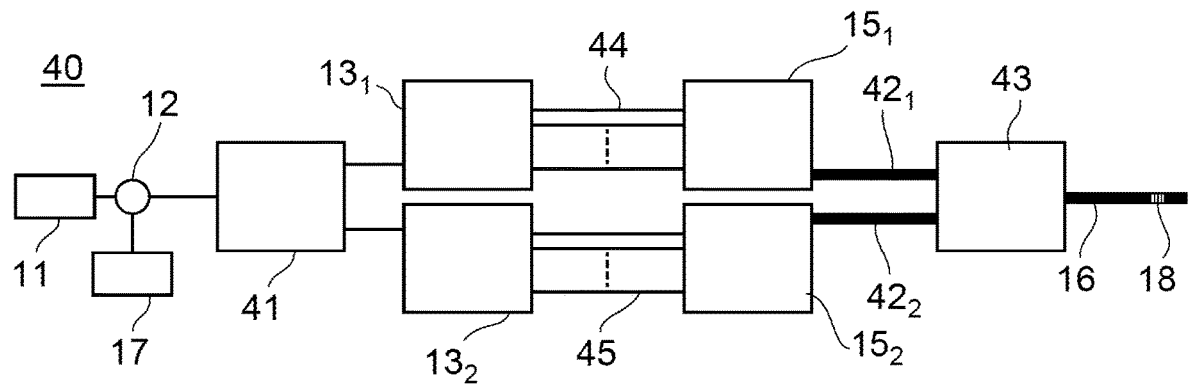
FIG. 4 shows a fourth example of a system for measuring P physical parameters with a multimode optical fiber according to the invention, the measurement system including two optical multiplexers.

FIG. 4 shows a fourth example of a system for measuring P physical parameters with a multimode optical fiber according to the invention. The measurement system 40 also includes a light source 11, an optical circulator 12, a multimode optical fiber 16 and a detection device 17. It additionally includes a first-order optical switch 41, a first second-order optical switch $13_1$, a second second-order optical switch $13_2$, X first single-mode transmission optical fibers 44, a second multimode transmission optical fiber $42_1$, Y third single-mode transmission optical fibers 45, a fourth multimode transmission optical fiber $42_2$, a first mode multiplexer $15_1$, a second mode multiplexer $15_2$ and a measurement-side optical switch 43. The optical switch 41 is arranged to receive the source optical signal and to temporally divide it into a first intermediate optical signal and a second intermediate optical signal. The first optical switch $13_1$ is arranged, similarly to the optical switch 13, in order to receive the first intermediate optical signal, to temporally divide it into X optical signals and to deliver each optical signal to one of the transmission optical fibers 44. The second optical switch $13_2$ is arranged to receive the second intermediate optical signal, to temporally divide it into Y optical signals and to deliver each optical signal to one of the transmission optical fibers 45. The first transmission optical fibers 44 and the third transmission optical fibers 45 are each arranged to transport an optical signal in the fundamental mode. The total number of first and third transmission optical fibers (X+Y) is equal to M, M being greater than or equal to P. The first transmission optical fiber $42_1$ is arranged to transport optical signals in at least X second predetermined propagation modes that are distinct from one another and chosen from the M second propagation modes of the multimode optical fiber 16. The fourth transmission optical fiber $42_2$ is arranged to transport optical signals in at least Y second predetermined propagation modes that are distinct from one another and the X second propagation modes, and chosen from the M second propagation modes of the multimode optical fiber 16. The first mode multiplexer $15_1$ is connected to the transmission optical fibers 44 and to the second transmission optical fiber $42_1$. It is arranged, on the one hand, to transfer each optical signal received from the transmission optical fibers 44 to the second transmission optical fiber $42_1$ by converting the fundamental mode into one of the X second propagation modes and, on the other hand, to transfer each reflected optical signal received from the second transmission optical fiber $42_1$ to one of the transmission optical fibers 44 by converting each second propagation mode into the fundamental mode. The second mode multiplexer $15_2$ is connected to the transmission optical fibers 45 and to the fourth transmission optical fiber $42_2$. It is arranged, on the one hand, to transfer each optical signal received from the transmission optical fibers 45 to the fourth transmission optical fiber $42_2$ by converting the fundamental mode into one of the Y second propagation modes and, on the other hand, to transfer each reflected optical signal received from the fourth transmission optical fiber $42_2$ to one of the transmission optical fibers 45 by converting each second propagation mode into the fundamental mode. The measurement-side optical switch 43 is arranged, on the one hand, to receive the X optical signals coming from the first mode multiplexer $15_1$ and the Y optical signals coming from the second mode multiplexer $15_2$, in order to temporally join these optical signals in order to obtain a common optical signal and to deliver this common optical signal to the multimode optical fiber 16 and, on the other hand, to receive a reflected common optical signal, to temporally divide this optical signal into two optical signals and to deliver each optical signal to one of the first and second mode multiplexers $15_1$, $15_2$.

Figure 5:
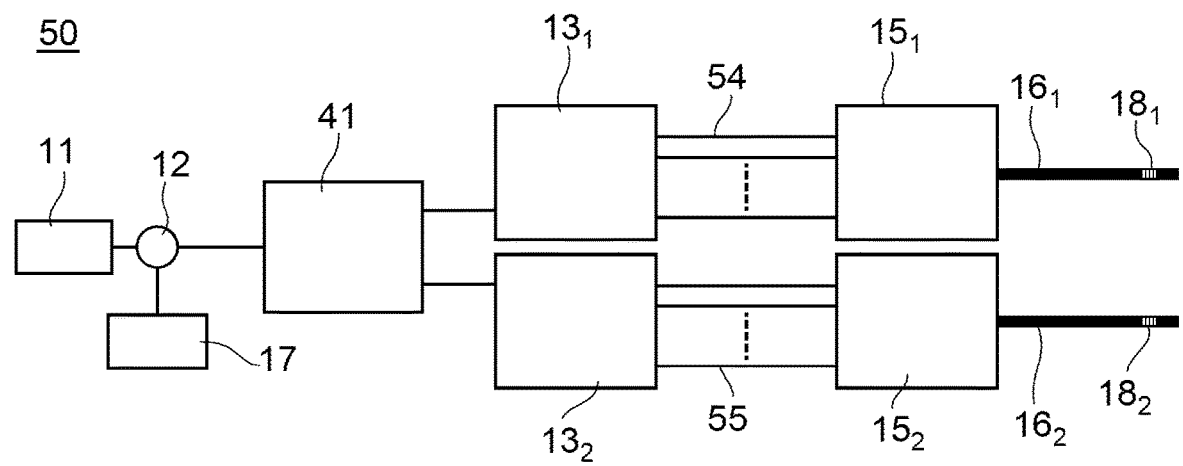
FIG. 5 shows an example of a system for measuring P+Q physical parameters with two multimode optical fibers according to the invention.

FIG. 5 shows an example of a system for measuring P+Q physical parameters with two multimode optical fibers according to the invention. The measurement system 50 also includes a light source 11, an optical circulator 12 and a detection device 17. It additionally includes a first-order optical switch 41, a first second-order optical switch $13_1$, a second second-order optical switch $13_2$, a first mode multiplexer $15_1$ and a second mode multiplexer $15_2$, respectively identical to those of the measurement system 40. The measurement system 50 also includes M first single-mode transmission optical fibers 54, N second transmission optical fibers 55, a first multimode measurement optical fiber $16_1$ and a second multimode measurement optical fiber $16_2$. The first optical switch $13_1$ is arranged to receive the first intermediate optical signal from the optical switch 41, to temporally divide it into M optical signals and to deliver each optical signal to one of the transmission optical fibers 54. The second optical switch $13_2$ is arranged to receive the second intermediate optical signal from the optical switch

41, to temporally divide it into N optical signals and to deliver each optical signal to one of the transmission optical fibers 55. The first transmission optical fibers 54 and the third transmission optical fibers 55 are each arranged to transport an optical signal in the fundamental mode. The first measurement optical fiber 16₁ is arranged to transport optical signals in at least M second predetermined propagation modes that are distinct from one another, M being an integer greater than or equal to P, and includes a first Bragg grating 18₁. The second measurement optical fiber 16₂ is arranged to transport optical signals in at least N fourth predetermined propagation modes that are distinct from one another, N being an integer greater than or equal to Q, and includes a second Bragg grating 18₂. The N fourth propagation modes may or may not be identical to the M second propagation modes. The first mode multiplexer 15₁ is connected to the transmission optical fibers 54 and to the first measurement optical fiber 16₁. It is arranged, on the one hand, to transfer each optical signal received from the transmission optical fibers 54 to the measurement optical fiber 16₁ by converting the fundamental mode into one of the M second propagation modes and, on the other hand, to transfer each reflected optical signal received from the first measurement optical fiber 16₁ to one of the transmission optical fibers 54 by converting each second propagation mode into the fundamental mode. The second mode multiplexer 15₂ is connected to the transmission optical fibers 55 and to the second measurement optical fiber 16₂. It is arranged, on the one hand, to transfer each optical signal received from the transmission optical fibers 55 to the measurement optical fiber 16₂ by converting the fundamental mode into one of the N fourth propagation modes and, on the other hand, to transfer each reflected optical signal received from the second measurement optical fiber 16₂ to one of the transmission optical fibers 55 by converting each fourth propagation mode into the fundamental mode.

The measurement system 50 may additionally include a processing unit, not shown, arranged to determine each of the P and Q physical parameters on the basis of the wavelengths of the reflected optical signals determined by the detection device 17, P×M predetermined sensitivity parameters $K_{PP}(j,i)$ and Q×N predetermined sensitivity parameters $K_{PP}(l,k)$. Each sensitivity parameter $K_{PP}(j,i)$ represents a sensitivity to a physical parameter $PP_j$ of the Bragg grating 18₁ for the second propagation mode i, with i being an integer between 1 and M and j being an integer between 1 and P. Each sensitivity parameter $K_{PP}(l,k)$ represents a sensitivity to a physical parameter $PP_l$ of the Bragg grating 18₂ for the fourth propagation mode k, with k being an integer between 1 and N and l being an integer between 1 and Q.

What is claimed is:

1. A measurement system for measuring P physical parameters with a multimode optical fiber, P being an integer greater than or equal to two, including:
   a light source, arranged to generate a source optical signal,
   a multimode measurement optical fiber arranged to transport optical signals in at least M second predetermined propagation modes that are distinct from one another, M being an integer greater than or equal to P, the measurement optical fiber including a measurement section arranged to reflect the optical signals with a wavelength that is variable according to the physical parameters to be measured,
   a detection device arranged to measure wavelengths of the optical signals reflected by the measurement section, and
   an optical module arranged to generate M optical signals from the source optical signal, the optical signals being injected into the measurement optical fiber in order to propagate each in one of the second propagation modes, the optical module also being arranged to transfer the optical signals reflected toward the detection device,
   wherein the optical module includes:
   X first transmission optical fibers, X being an integer greater than or equal to two, each first transmission optical fiber being arranged to transport an optical signal in a first predetermined propagation mode,
   a second multimode transmission optical fiber arranged to transport optical signals in at least X second predetermined propagation modes that are distinct from one another,
   Y third transmission optical fibers, Y being an integer greater than or equal to two, each third transmission optical fiber being arranged to transport an optical signal in a third predetermined propagation mode, the sum of X and Y being equal to M,
   a fourth multimode transmission optical fiber arranged to transport optical signals in at least Y second predetermined propagation modes that are distinct from one another and X second propagation modes,
   a first mode multiplexer connected, on the one hand, to the X first transmission optical fibers and, on the other hand, to the second transmission optical fiber, the first mode multiplexer being arranged to transfer the optical signals received from the first transmission optical fibers to the second transmission optical fiber by converting each first propagation mode into one of the X second propagation modes, and arranged to transfer each reflected optical signal received from the second transmission optical fiber to one of the first transmission optical fibers by converting each second propagation mode into the first propagation mode associated with said first transmission optical fiber,
   a second mode multiplexer connected, on the one hand, to the Y third transmission optical fibers and, on the other hand, to the fourth transmission optical fiber, the second mode multiplexer being arranged to transfer the optical signals received from the third transmission optical fibers to the fourth transmission optical fiber by converting each third propagation mode into one of the Y second propagation modes, and arranged to transfer each reflected optical signal received from the fourth transmission optical fiber to one of the third transmission optical fibers by converting each second propagation mode into the third propagation mode associated with said third transmission optical fiber,
   a source-side optical splitter or a source-side optical switch, the source-side optical splitter being arranged to receive the source optical signal, to split this source optical signal into X+Y optical signals, to deliver, to each first transmission optical fiber an optical signal in the first propagation mode associated with said first transmission optical fiber and to deliver, to each third transmission optical fiber an optical signal in the third propagation mode associated with said third transmission optical fiber, the source-side optical switch being arranged to receive the source optical signal, to temporally divide this source optical signal into X+Y optical signals, to deliver, to each first transmission optical fiber, an optical signal in the first propagation mode associated with said first transmission optical fiber, and to deliver, to each third transmission optical fiber an optical signal in the third propagation mode associated with said third transmission optical fiber, and a measurement-side optical splitter or a measurement-side optical switch, the measurement-side optical splitter being arranged, on the one hand, to receive the optical signals from the first mode multiplexer and the second mode multiplexer, to add these optical signals in order to obtain a common optical signal, and to deliver this common optical signal to the measurement optical fiber and, on the other hand, to receive a reflected common optical signal, to split this reflected common optical signal into two optical signals and to deliver each of these optical signals to one of the first and second mode multiplexers, the measurement-side optical switch being arranged, on the one hand, to receive the optical signals from the first mode multiplexer and the second mode multiplexer, to temporally join these optical signals in order to obtain a common optical signal and to deliver this common optical signal to the measurement optical fiber and, on the other hand, to receive a reflected common optical signal, to temporally divide this reflected common optical signal into two optical signals and to deliver each of these optical signals to one of the first and second mode multiplexers.

2. The measurement system according to claim 1, wherein the optical module includes:

M transmission optical fibers, each transmission optical fiber being arranged to transport an optical signal in a first predetermined propagation mode, and a mode multiplexer connected, on the one hand, to the M transmission optical fibers and, on the other hand, to the measurement optical fiber, the mode multiplexer being arranged to transfer the optical signals received from the transmission optical fibers to the measurement optical fiber by converting each first propagation mode into one of the second propagation modes, and arranged to transfer each reflected optical signal received from the measurement optical fiber to one of the transmission optical fibers by converting each second propagation mode into the first propagation mode associated with the transmission optical fiber.

3. The measurement system according to claim 2, wherein the transmission optical fibers are single-mode optical fibers, each of the first propagation modes being the fundamental mode.

4. The measurement system according to claim 2 additionally including an optical splitter arranged to receive the source optical signal, to split this source optical signal into M optical signals and to deliver, to each transmission optical fiber, an optical signal in the first propagation mode associated with said transmission optical fiber.

5. The measurement system according to claim 4, wherein the optical splitter is also arranged to receive the reflected optical signals received from the transmission optical fibers, to add these reflected optical signals in order to obtain a reconstituted optical signal and to deliver said reconstituted optical signal to the detection device, the measurement system additionally including an optical circulator arranged to transfer the source optical signal from the light source to the optical splitter and to transfer the reconstituted optical signal to the detection device.

6. The measurement system according to claim 2 additionally including an optical switch arranged to receive the source optical signal, to temporally divide this source optical signal into M optical signals and to deliver, to each transmission optical fiber, an optical signal in the first propagation mode associated with the transmission optical fiber.

7. The measurement system according claim 6, wherein the optical switch is also arranged to receive the reflected optical signals received from the transmission optical fibers, to temporally join these reflected optical signals in order to obtain a reconstituted optical signal and to deliver said reconstituted optical signal to the detection device, the measurement system additionally including an optical circulator arranged to transfer the source optical signal from the light source to the optical switch and to transfer the reconstituted optical signal to the detection device.

8. The measurement system according to claim 2, wherein the detection device includes K detectors, K being an integer greater than or equal to two and less than or equal to M, each detector being arranged to measure a wavelength of one or more reflected optical signals received from one or more transmission optical fibers.

9. The measurement system according to claim 1, wherein the first transmission optical fibers and the third transmission optical fibers are single-mode fibers, each of the first propagation modes and each of the third propagation modes being the fundamental mode.

10. The measurement system according to claim 1, additionally including a processing unit arranged to determine each of the P physical parameters according to wavelengths of the optical signals reflected by the measurement section and P×M predetermined sensitivity parameters $K_{PP}$, each sensitivity parameter $K_{PP}$ representing a sensitivity to a physical parameter $PP_j$ of the measurement section for the second propagation mode i, with i being an integer between 1 and M and j being an integer between 1 and P.

* * * * *